United States Patent
Kucharski et al.

(10) Patent No.: US 6,353,474 B1
(45) Date of Patent: Mar. 5, 2002

(54) HIGH ACCURACY DATA ACQUISITION PORT FOR ENVIRONMENTAL CHAMBER PHOTOGRAMMETRY

(75) Inventors: Thaddeus Kucharski, Marina Del Rey; Grant Ager, Encenitas; Jose J. Barbosa, Hawthorne; Roberto Conte, Culver City; Gregory H. Link, Sherman Oaks; William D. McKay, Torrance; Alan W. Tom, La Palma; William J. Brennan, III, Carson, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/548,482

(22) Filed: Apr. 13, 2000

(51) Int. Cl.$^7$ .................................................. G01J 1/42
(52) U.S. Cl. ........................... 356/218; 348/80; 348/81; 396/427
(58) Field of Search ........................... 356/218; 348/80, 348/81; 396/427, 89

(56) References Cited

U.S. PATENT DOCUMENTS 4,977,418 A * 12/1990 Canty ............................ 354/63
5,068,720 A * 11/1991 Herlitz et al. ................ 358/100

* cited by examiner

Primary Examiner—Frank G. Font
Assistant Examiner—Roy M. Punnoose

(57) ABSTRACT

An improved system and method for obtaining photogrammetric measurements which eliminates optical distortions created by thermal gradients on windows that are used to protect the photogrammetry camera. A gate valve is introduced between the window and the wall that opens for a limited time to allow the camera to take measurements of a test article contained within a thermal testing chamber. This limits or eliminates any thermal gradients on the window and improves photogrammetric measurements. With a gate valve the window can be removed entirely, as the gate valve can prevent a thermal gradient from being introduced to the lens of the photogrammetry camera. The improved system is suited for making close-in photogrammetric measures of test articles on earth.

14 Claims, 2 Drawing Sheets

HIGH ACCURACY DATA ACQUISITION PORT FOR ENVIRONMENTAL CHAMBER PHOTOGRAMMETRY

TECHNICAL FIELD

The present invention relates generally to photogrammetry, and more particularly, to improved low temperature photogrammetry for satellite systems.

BACKGROUND

Historically, photogrammetry of test objects has been performed in a thermal test chamber that incorporates a transparent window into an outer test chamber wall. The transparent window acts as a barrier between the measurement equipment and the test environment, while providing visual access for the photogrammetric equipment through the window. At low temperatures it has been necessary to heat the outer surface of the window to prevent the formation of condensation and consequent loss of visibility. As a result of this heating, a thermal gradient exists across the thickness of the window. Historical data suggests that the thermal gradient causes both a physical and optical distortion in the window, which negatively affects the accuracy of photogrammetry measurements (data) acquired through it. The disadvantage of the current system is that measurement accuracy is degraded at temperatures approaching or equaling those experienced by satellite components in space.

In order to improve low temperature (i.e. below condensing or frosting temperature) photogrammetry, the optical distortions should be limited or eliminated. This can be accomplished by limiting or eliminating the thermal gradient that exists across the visual access window or by removing the transparent window entirely.

SUMMARY OF THE INVENTION

It is therefore an object of the present invention to limit or eliminate thermal gradients induced upon photogrammetry system windows by moving the window from the outer thermal wall to a position inside the housing containing the photogrammetry camera. A gate valve is added between the outer thermal wall and the window to act as a barrier to the outside environment. The gate valve opens for a limited time to allow individual photogrammetry exposures, and closes before a significant thermal gradient can be induced upon the transparent photogrammetry window. To assist in the thermal isolation of the transparent photogrammetry window within the housing, pressurized dry gas (typically nitrogen) at ambient temperature and compatible with the housing environment is introduced into the housing. The gas maintains the transparent photogrammetry window near ambient temperatures when the gate valve is closed and acts as a thermal barrier between the transparent photogrammetry window and the thermal test chamber when the gate valve is open.

It is another object of the present invention in an alternative embodiment to eliminate the use of the transparent photogrammetry window entirely by replacing it with a gate valve. The gate valve is opened for a limited time to allow for photogrammetry exposures. The gate valve remains closed at all other times to maintain the photogrammetry camera near ambient temperatures. To assist in the thermal isolation of the camera, pressurized dry gas is introduced in the housing, thus preventing the formation of condensation on the camera body or lens. In addition, while the gate valve is open, additional pressurized dry gas can be introduced near the camera and lens to act as an additional thermal barrier.

Because of these features the present invention is particularly suitable for making photogrammetric measurements of satellite components on earth in simulated extreme temperature conditions. In this way, satellite components may be evaluated for such things as thermal stability prior to being placed in space.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENTS

The following description is described with respect to a photogrammetry camera for use in satellite applications. However, those skilled in the, art would recognize that the embodiments of the present invention might have applications beyond satellite applications.

Figure 1:
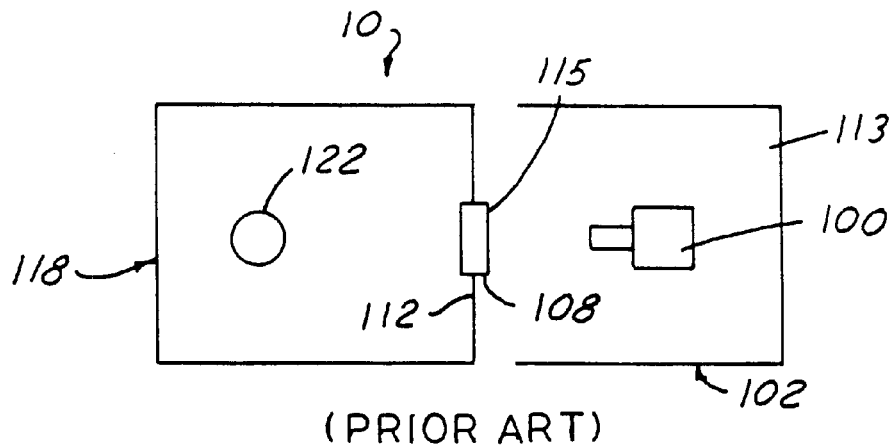
FIG. 1 is a simple view photogrammetry chamber containing the thermal test chamber and housing containing the photogrammetry camera as seen in the prior art.

FIG. 1 shows a simple view of the thermal test chamber 118 and the housing 102 of a photogrammetry system 10 according to the prior art. The housing 102 contains a photogrammetry camera 100. An object (test article) 122 is placed within the thermal test chamber 118, and a photogrammetric measurement is made by the photogrammetry camera 100 through a window 108 formed integrally within a wall 112 between the thermal test chamber 118 and the housing 102. The window 108 is typically composed of fused silica and serves to protect the object 122 from the outside environment. To prevent condensation or frost on the window 108, pressurized gas warms the outer surface 115 of the window 108. The pressurized gas may be heated if necessary. However, by warming the window 108, a thermal gradient is induced which can cause an optical distortion at the window 108. The optical distortion in turn can adversely affect photogrammetric measurements of the test object 122.

Figure 2:
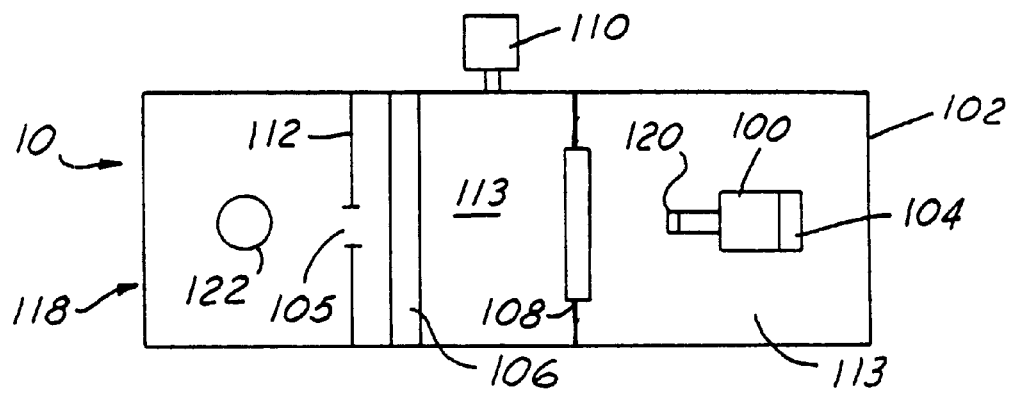
FIG. 2 is a cross-sectional view of one preferred embodiment of the present invention containing a transparent window member.

FIG. 2 shows one preferred embodiment of the present invention. In FIG. 2, a photogrammetry system 10 has a photogrammetry camera 100 contained within a housing 102 that is mounted on a turntable bearing 104. The turntable bearing 104 allows the photogrammetry camera 100 to rotate 360 degrees around its optical axis. The system 10 further contains a window 108, a gas purge plenum 110, a gate valve 106, a wall 112, and a thermal test chamber 118 which contains an object 122 that can be photogrammetrically measured. The wall 112 has an opening 105 that allows for photogrammetric measurements to be taken whenever the gate valve 106 is opened.

In the preferred embodiment of FIG. 2, the window 108 is not formed integrally with the wall 112, instead the window 108 is mounted within the housing 102 in a position located adjacent to the lens 120 of the camera 100. In addition, the window 108 rotatably cooperates with the camera 100 such that the distortion contribution of the window 108 will not need to be accounted for by the software used to calibrate the lens 120 in the photogrammetric measurements. A gate valve 106 is added between the window 108 and the wall 112. A chamber 113 formed within the housing 102 is filled with pressurized gas (not shown) from the gas purge plenum 110 when the gate valve 106 is closed. A thermal gradient is thus created across the gate valve 106, not the window 108.

To operate the photogrammetry camera 100, the gate valve 106 is opened to expose the window 108 to the thermal test chamber 118 containing a test article 122. The photogrammetry camera 100 then takes a measurement of the test article 122. The gate valve 106 is then closed. The entire process typically takes under five seconds. The pressurized gas within the housing 102 maintains the window 108 at approximately ambient temperatures during the entire photogrammetry process, and therefore eliminates a significant thermal gradient from being induced on the window 108, which in turn eliminates any optical distortion which may adversely affect the accuracy of the photogrammetry data obtained. The pressurized gas may be heated prior to introduction to the chamber 113 to maintain the chamber 113 at acceptable temperatures for the camera 100 equipment. Preferably, the pressurized gas is nitrogen.

Figure 3:
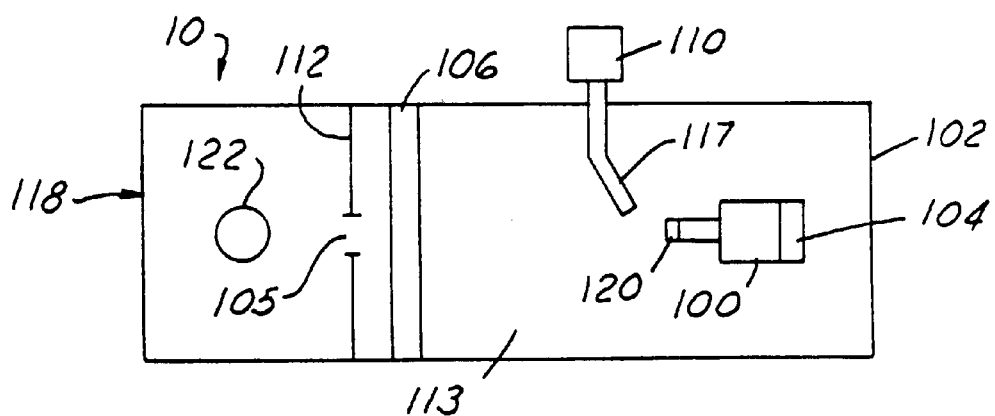
FIG. 3 is a cross-sectional view of another preferred embodiment of the present invention without the transparent window member.

FIG. 3 shows another preferred embodiment of the present invention. In FIG. 3, the window 108 of FIG. 2 is eliminated entirely. Pressurized gas from the gas purge plenum 110 is introduced into the chamber 113 of the housing 102 and acts to keep the camera 100 at nearly constant temperature while the gate valve 106 is open. Without a window 108, there is no chance of optical distortion. Thus, the precision and accuracy of the photogrammetric measurements are optimized.

To operate the photogrammetry camera 100 of FIG. 3, the gate valve 106 is opened to expose the photogrammetry camera 100, and specifically the lens 120 of the photogrammetry camera 100, to the thermal test chamber 118 containing the test article 122. After the photogrammetry camera 100 takes a measurement of a test article 122, the gate valve 106 is closed. The entire process typically takes under five seconds. Pressurized gas (not shown) within the chamber 113 keeps the camera 100 at approximately ambient temperatures while the gate valve 106 is opened, thus preventing a thermal gradient from forming on the lens 120. If desired, one or more nozzles 117 may be added from the gas purge plenum 110 to direct the gas output towards the photogrammetric camera 100 to form a flowing barrier across the camera 100 whenever the gate valve 106 is opened, thus providing for additional thermal isolation of the camera 100 and the lens 120. Again, the pressurized gas may be heated pressurized gas if necessary to maintain the camera 100 equipment at acceptable temperatures.

Figure 4:
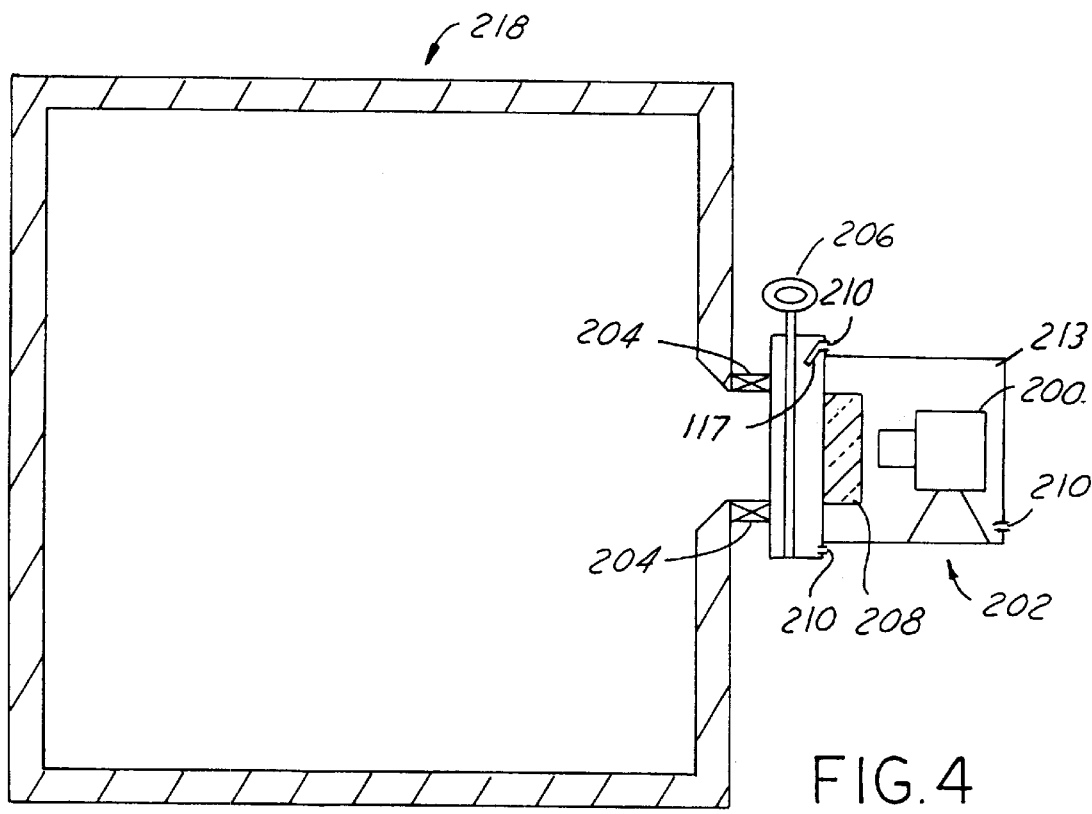
FIG. 4 is a cross-sectional view of another preferred embodiment of the present invention containing a transparent window member.
Figure 5:
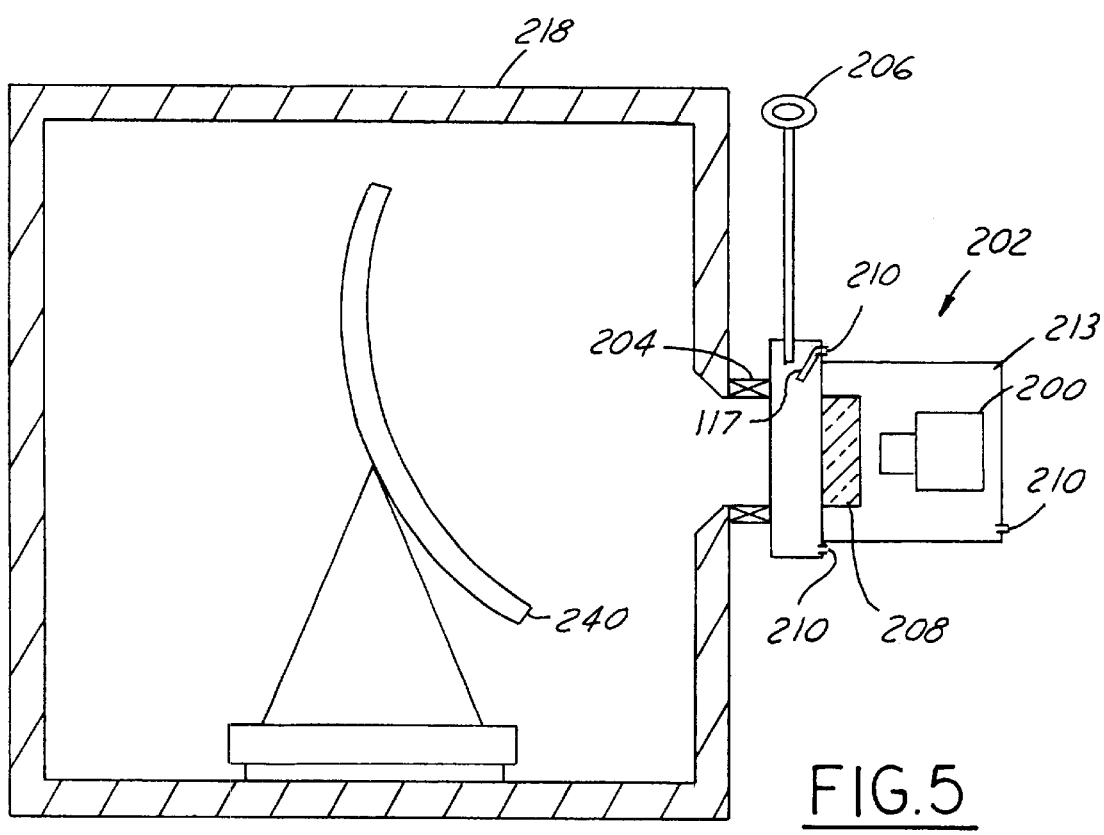
FIG. 5 is a more detailed view of FIG. 4 containing a satellite component test article.

FIGS. 4 and 5 show another preferred embodiment of the present invention. The system has a window 208, a photogrammetry camera 200, a gas purge plenum 210, and a gate valve 206. In this embodiment, the turntable bearing 204 cooperates with the thermal chamber wall 212 and the housing 202. The entire housing 202 can rotate 360 degrees around its optical axis. In addition, the thermal test chamber 218 is much larger in size than the housing 202 and is able to hold larger test objects, such as satellite components 240 as shown in FIG. 5. This system is particularly suited for making photogrammetric measurements of larger components, such as satellite components 240, as shown in FIG. 5. It is also contemplated that the window 208 may be removed and an array of nozzles 117 may be coupled to the gas purge plenum 210 to provide additional thermal isolation of the photogrammetry camera 200 when the gate valve 206 is opened.

FIG. 4 illustrates the system when the gate valve 206 is in the closed position. The gate valve 206 creates a barrier between the cold environmental nitrogen in the thermal test chamber 218 and the pressurized nitrogen that surrounds the transparent window 208 within the chamber 213.

FIG. 5 illustrates the system when the gate valve 206 is in the open position to allow the photogrammetry camera 200 to acquire the satellite component 240. In the open position, a relatively small amount of positive pressure nitrogen enters the thermal test chamber 218.

The embodiment as shown in FIGS. 4 and 5, both with and without a window 208, have particular use for making close-in photogrammetric measurements of satellite components 240 while on the earth.

It is thus the object of the present invention to provide an apparatus and method for obtaining photogrammetric measurements of a test article 122 in a low temperature environment without optical distortion with or without the use of a window 108, 208. The method comprises the steps of introducing a quantity of pressurized gas from a gas purge plenum 110, 210 into the chamber 113, 213 of the housing 102, 202 such that thermal gradients are lessened or eliminated across either the window 108, 208 or the lens 120; opening a gate valve 106, 206 for a few seconds so as to expose the photogrammetry camera 100, 200 to a test object 122 contained within the thermal test chamber 118, 218; obtaining photogrammetric measurements from the photogrammetry camera 100, 200 on the test object 122; and closing the gate valve 106, 206. When the window 108, 208 is not provided, the present invention may also include nozzles 117 located on the gas purge plenum 110, 210 that are directed at the lens 120 that provide additional pressurized gas to the lens 120 to provide additional thermal stability.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features that constitute the essential features of these improvements within the true spirit and the scope of the invention.

What is claimed is:

1. A system for making accurate photogrammetric measurements in low temperature environments comprising:

a housing (102, 202) substantially enclosing a chamber (113, 213);

a photogrammetry camera (100, 200) positioned within said housing chamber (113, 213), said photogrammetry camera (100, 200) having a lens (120);

a gas purge plenum (110, 210) coupled to said housing (102, 202);

a first source of pressurized gas located within said gas purge plenum (110, 210);

said housing (102, 202) having a wall (112, 212) containing an opening (105); and a gate valve (106, 206) in said housing (102, 202) positioned between said wall (112, 212) and said camera (100, 200), said gate valve (106, 206) having an open position and a closed position.

2. A system as in claim 1, wherein said gas purge plenum further comprises a plurality of nozzles directed towards said photogrammetry camera.

3. A system as in claim 1 further comprising a transparent window member (108, 208) mounted between said lens (120) and said gate valve (106, 206) in said chamber (113, 213).

4. A system as in claim 1, where said first source of pressurized gas comprises a heated pressurized gas.

5. A system as in claim 1, where said first source pressurized gas comprises a pressurized nitrogen gas.

6. A method of making photogrammetric measurements with a photogrammetry camera (100, 200) in a low temperature environment, said camera (100, 200) having a lens (120) and positioned within a housing chamber (113, 213) of a housing (102, 202) having a gate valve (106, 206) and a coupled gas purge plenum (110, 210), the method comprising the steps of:

introducing a quantity of pressurized gas into said chamber (113, 213);

opening said gate valve (106, 206) to expose said photogrammetry camera (100, 200);

obtaining photogrammetric measurements from said photogrammetry camera (100, 200); and;

closing said gate valve (106, 206).

7. The method according to claim 6, wherein the step of introducing a quantity of pressurized gas to said chamber (113, 213) comprises the step of introducing said quantity of pressurized gas from said coupled gas purge plenum (110, 210) in said chamber (113, 213).

8. The method according to claim 6, wherein the step of opening said gate valve comprises the step of moving said gate valve from a first position to a second position.

9. The method according to claim 8, wherein the step of closing said gate valve comprises the step of moving said gate valve from said second position to said first position.

10. The method according to claim 6, further comprising the step of introducing a second quantity of pressurized gas from said coupled gas purge plenum (110, 210) through at least one nozzle (117) when said gate valve (106, 206) is opened, where said second quantity of pressurized gas is directed at said photogrammetry camera (100, 200), wherein additional thermal isolation of said photogrammetry camera (100, 200) is provided.

11. A method of making photogrammetric measures with a photogrammetry camera (100, 200) in a low temperature environment, the photogrammetry camera (100, 200) positioned within a chamber (113, 213) of a housing (102, 202) having a gate valve (106, 206), a coupled gas purge plenum (110, 210), and a transparent window member (108, 208) positioned between the gate valve (106, 206) and the photogrammetry camera (100, 200) in said chamber (113, 213), the method comprising:

introducing a quantity of pressurized gas located between said gate valve (106, 206) and said photogrammetric camera (100, 200) to said chamber (113, 213);

opening said gate valve (106, 206) to expose said photogrammetry camera (100, 200);

obtaining photogrammetric measurements from said photogrammetry camera (100, 200); and;

closing said gate valve (106, 206).

12. The method according to claim 11, wherein the step of introducing a quantity of pressurized gas to said chamber (113, 213) comprises the step of introducing said quantity of pressurized gas from said coupled gas purge plenum (110, 210) to said chamber (113, 213).

13. The method according to claim 11, wherein the step of opening said gate valve comprises the step of moving said gate valve from a first position to a second position.

14. The method according to claim 13, wherein the step of closing said gate valve comprises the step of moving said gate valve from said second position to said first position.

* * * * *